United States Patent [19]

Sundie et al.

[11] 4,165,305

[45] Aug. 21, 1979

[54] TWO-COMPONENT BINDER FOR EXTERIOR FIBERBOARD

[75] Inventors: Richard D. Sundie, Montvale; William R. Michael, West Orange, both of N.J.

[73] Assignee: Allied Chemical Corporation, Morris Township, Morris County, N.J.

[21] Appl. No.: 877,590

[22] Filed: Feb. 13, 1978

Related U.S. Application Data

[63] Continuation of Ser. No. 696,159, Jun. 14, 1976, abandoned.

[51] Int. Cl.$^2$ .................. C08L 61/28; C08L 61/24
[52] U.S. Cl. ........................... 260/29.4 R; 427/45; 428/528; 428/530; 528/254; 528/259
[58] Field of Search ............... 260/29.4 R, 67.6 R; 528/254–259; 427/45; 428/528

[56] References Cited

U.S. PATENT DOCUMENTS

| | | | |
|---|---|---|---|
| 3,100,754 | 8/1963 | Booth et al. | 260/29.4 |
| 3,159,593 | 12/1964 | Morini et al. | 260/29.4 |
| 3,891,590 | 6/1975 | Sundie et al. | 260/29.4 R |

*Primary Examiner*—Theodore E. Pertilla
*Attorney, Agent, or Firm*—Alan M. Doernberg; Roger H. Criss; Michael S. Jarosz

[57] ABSTRACT

A two-component binder system for exterior grade fiberboard and other products, the first component comprising a stable aqueous solution of about 10 to 15 weight percent urea, about 30 to 40 weight percent formaldehyde, about 25 to 40 weight percent water, about 15 to 25 weight percent melamine, about 0.4 to 1.0 weight percent of a buffering agent which maintains the pH at about 6.5 to 7.0 and optionally up to about 6 weight percent of an alkanol of 1 to 6 carbon atoms, the solution having a viscosity when formed of less than about 60 cps and a viscosity after about 7 days of less than about 1000 cps. The second component is a solution comprising about 35 to 55 weight percent urea, about 45 to 65 percent water and optionally up to about 4 weight percent of a catalyst which promotes the reaction of urea, formaldehyde and melamine. The two components may be admixed at room temperature in a ratio of about 3 to 5 parts of the first component to one part of the second component to form the binder.

12 Claims, No Drawings

TWO-COMPONENT BINDER FOR EXTERIOR FIBERBOARD

This is a continuation of Application Ser. No. 696,159, filed June 14, 1976 now abandoned.

BACKGROUND OF THE INVENTION

1. Field of the Invention

This invention relates to a two-component binder for use in the production of exterior-grade fiberboard and other wood products, to the composition of one of such components and its process of manufacture, to a process of producing such binder and to fiberboards impregnated with the binder.

2. Discussion of the Prior Art

Lignocellulosic products such as wood fiberboard, particle board and plywood materials are usually treated during their assembly with phenolic or similar type resins to impart waterproof characteristics to the product. For example, in the fiberboard industry, phenolic resins are used to produce hardboard by a hot-press method wherein the wood fibers are impregnated with the resin, an impregnated mat is formed therefrom and the impregnated mat is compressed to a desired thickness between pressure platens at elevated temperatures and elevated pressures for a considerable time. In some operations, partially polymerized urea-formaldehyde resins are blended with melamine-formaldehyde resins to produce the desired waterproof bond. In order to be rated as exterior-grade materials, such products must pass the accelerated aging tests of ASTM Test Method D-1037. Due to the necessity of utilizing a hot-press method for curing the phenolic resin, which involves a slow cure of the resin, the rates of production are considered slow for commercial operations. Additionally, some of the above-mentioned resins are excessively tacky which presents problems in providing a homogeneous impregnation of the wood fiber or particles and creates pluggage problems in conveying the impregnated material prior to its formation into a board. Consequently, there currently is no medium density (e.g., 37 to 50 pounds per cubic foot) fiberboard made with a phenolic binder. Moreover, phenolic resin based systems must be cured by the hot platen press method as opposed to the faster radio frequency cure methods.

Medium density fiberboard for exterior siding has been previously produced using a urea-melamine-formaldehyde resin as the binder. Such system required the handling of four components in a reactor and the resultant resin had a very short shelf life (e.g., on the order of about 1 day). In such a system, an aqueous concentrate of urea and formaldehyde was mixed with melamine, urea and water, heated for a time sufficient to dissolve the melamine and blended with a curing catalyst. Although such binder exhibited little tack and was useful for binding fiberboards which were cured by a radio frequency equipped press, its shelf life necessitated in situ formation in the fiberboard plant involving the use of four components in a carefully controlled process.

Amino resin binders useful for fiberboard and plywood are also described in U.S. Pat. No. 3,629,176 to Shriver, wherein melamine, and optionally urea and water, are added at a temperature no higher than 100° F. to a urea-formaldehyde reaction product to obtain a slurry which can be employed to bond fiberboard and the like but which has a relatively short stable life. Thus, like the system described in the preceding paragraph, such a system must be formulated in the fiberboard plant since the solids of the slurry would separate out after a relatively short period of time so as to preclude shipment of such product in slurry form.

U.S. Pat. No. 3,458,464 to Shriver et al. discloses aqueous urea-formaldehyde-melamine concentrates in which melamine and urea are added to an aqueous formaldehyde solution which is heated and then concentrated after cooling. Although it is suggested in such patent that urea and melamine may be dissolved in the liquid to obtain a reaction mixture useful in producing adhesives, molding powders and fabric-treating resins, the concentrate itself contains a very large amount of formaldehyde in order to render the concentrate stable and a very small amount of melamine. Consequently, there is an odor problem associated with the large amount of formaldehyde present in such concentrate. The system as envisioned in the Shriver et al. patent is at least a three-component system wherein urea and melamine plus the urea-formaldehyde-melamine concentrate are employed. Moreover, it has been found that the product of Shriver et al. becomes unstable (i.e., becomes solid) after about three days' storage.

A two-component curable amino resin is described in U.S. Pat. No. 3,891,590 to Sundie et al. However, it has been found that such resin is not useful for exterior grade fiberboard meeting the requirements of ASTM D-1037.

U.S. Pat. No. 2,085,492 to Ellis (1937) discloses carrying out the reaction of urea and acid-containing methanolic formaldehyde in the presence of additional methanol solvent or other volatile diluent miscible with water in order to lessen the thermal effect of the reaction and to obtain a soluble product; the solvent is recovered after the reaction is completed.

U.S. Pat. No. 3,826,770 to Christensen et al. (1974) discloses urea-formaldehyde aqueous concentrates useful in the manufacture of particle board and the like, which contain an ionized inorganic salt as a stabilizer.

Australian Patent Application 60,444 to Montecatini (1960) discloses a melamine-formaldehyde solution in a hydroalcoholic medium, such as methanol, and containing an aromatic sulfamide as stabilizing agent.

British Plastics, August 1953 (pages 306–308) discloses aqueous melamine-formaldehyde syrups which are stabilized against gellation and precipitation by the incorporation of an alcohol and borax.

It would desirable if a two-component binder system for exterior grade fiberboard and other wood products and the like were provided, which system was sufficiently stable so that it could be shipped separately to fiberboard manufacturing facilities and stored for commercially practical times.

SUMMARY OF THE INVENTION

In accordance with this invention, there is provided a stable aqueous solution of urea, melamine and formaldehyde, which solution has a viscosity when formed of less than about 60 cps and which has a viscosity after about 7 days of less than about 1,000 cps, the composition comprising, in percent by weight based upon the total weight for the composition, about 10 to 15 percent urea, about 30 to 40 percent formaldehyde, about 25 to 40 percent water, about 15 to 25 percent melamine, about 0.4 to 1.0 percent of a buffering agent which maintains the pH of the composition at a value ranging from about 6.5 to 7.0, and optionally up to about 6 percent of an alkanol of 1 to 6 carbon atoms.

In further accordance with this invention, such a composition is prepared by a process which comprising forming a mixture of about 10 to 15 parts by weight urea, about 30 to 40 parts by weight formaldehyde, about 5 to 10 parts by weight water, about 15 to 25 parts by weight melamine and about 0.4 to 1.0 parts by weight of a buffering agent which maintains the composition at a pH of about 6.5 to 7.0; heating the mixture to a temperature of about 60° to 90° C., with agitation, for a time ranging from about 10 to 60 minutes; cooling the mixture to about 20° to 30° C. within about 10 to 30 minutes and adding to the mixture about 15 to 35 parts by weight of water and optionally up to about 6 parts by weight of an alkanol of 1 to 6 carbon atoms.

Also in accordance with this invention, a two-component system useful for preparing an amino resin is provided, which comprises a first component comprising the composition described above and a second component, to be blended with the first component in a weight ratio of about 3:1 to 5:1 parts of the first component to the second component, the second component comprising about 35 to 55 percent by weight urea, about 45 to 65 percent by weight water and optionally up to about 4 percent by weight of a catalyst which promotes the reaction of urea, melamine and formaldehyde.

Further in accordance with this invention, a process for forming a curable amino resin useful as a binder for medium density exterior grade fiberboard is provided, which process comprises the steps of forming a first component by preparing a composition as first described above, forming a second component by admixing from about 35 to 55 percent by weight urea, about 45 to 65 percent by weight water and optionally up to about 4 percent by weight of a catalyst which promotes the reaction of urea, melamine and formaldehyde, and admixing about 3 to 5 parts by weight of the first component with 1 part by weight of the second component.

Also in accordance with this invention, there is provided a fiberboard comprising fibrous material impregnated with the above-described amino resin which is a mixture of the first and second components in the amounts specified above. Such fiberboard is prepared by a process which comprises impregnating the fibrous material with such resin, forming the impregnated fibrous material into a mat and compressing the mat to a desired thickness under suitable pressure and in the presence of radio frequency waves and/or at elevated temperatures until the resin is cured and becomes intimately bonded to the fibrous material.

It has been found that the first component of this invention provides the requisite amount of urea, melamine and formaldehyde for use as an adhesive when combined with the second component. Both components have commercially acceptable storage lives and can be used to prepare the adhesive resin by merely blending in an in-line mixer at room temperature, for example, in a fiberboard plant or the like. It has also been found that the presence of the alkanol in the first component increases its stability and storage life. The adhesive resin produced by mixing the two components is curable by radio frequency heating and hence the hot platen press method of forming fiberboard need not be employed. Medium density fiberboard impregnated with the two-component curable amino resins of this invention is suitable for use as exterior-grade material and meets the applicable ASTM requirements.

DESCRIPTION OF THE PREFERRED EMBODIMENT

The first component comprises an aqueous solution of from about 10 to 15 weight percent urea, about 30 to 40 weight percent formaldehyde, about 25 to 40 weight percent water, about 15 to 25 weight percent melamine, about 0.4 to 1.0 weight percent of the buffering agent and about 0 to 6 weight percent of the alkanol. Preferred compositions include about 12 to 14 weight percent urea, about 30 to 35 weight percent formaldehyde, about 25 to 35 weight percent water, about 15 to 20 weight percent melamine, about 0.4 to 0.6 weight percent of the buffering agent and about 2 to 6 weight percent of the alkanol. The urea, formaldehyde and a portion of the water of the first component are preferably added as a concentrate. Such a concentrate is a liquid non-resinous urea-formaldehyde reaction product which contains urea and formaldehyde reacted only to the polymethylolurea stage and is stable for storage periods of at least two months at room temperature. Such concentrates may be employed in amounts of about 50 to 60 weight percent of the composition. A product of this type is commercially available as U.F. Concentrate 85 from Allied Chemical Corporation; such product typically contains about 25 weight percent urea, about 60 weight percent formaldehyde and about 15 weight percent water.

The buffering agent used for this invention may be a suitable buffering agent known in the art which, when present in the amounts indicated above, maintains the pH of the first component at about 6.5 to 7.0, preferably at a value of about 6.7 to 6.9. Hence, the first component of this system is essentially neutral. Preferred buffering agents include boric acid, borax (hydrated sodium borate) and mixtures thereof. Examples of other such buffering agents include other inorganic acids such as nitric acid, iodic acid, phosphoric acid, sulfuric acid and hydrochloric acid; organic acids such as acetic acid, citric acid, formic acid, oxalic acid, stearic acid and tartaric acid; salts of such organic or inorganic acids, preferably salts of an alkali metal (e.g., lithium, sodium and potassium) or an alkaline earth metal (e.g., magnesium, calcium, strontium and barium) such as sodium phosphate and the like; ammonium salts of such organic or inorganic acids such as ammonium borate, ammonium nitrate, ammonium sulfate and ammonium acetate; and mixtures of the above. Of the above stabilizers, a mixture of boric acid and borax is the most preferred, preferably in the amounts of about 0.4 to 0.8 weight percent boric acid and about 0.02 to 0.05 weight percent borax, most preferably about 0.4 to 0.6 weight percent boric acid and about 0.02 to 0.03 weight percent borax.

The alkanol may contain from about 1 to 6 carbon atoms. Exemplary of such alkanols are methanol, ethanol, propanol, isopropanol, n-butanol, n-pentanol and n-hexanol and mixtures thereof. It has been found that the presence of the alkanol in the composition greatly improves its stability. For example, a typical composition without the alkanol may have a viscosity of about 1000 cps after 10 days of storage at 25° C., indicating that it is still stable, but the viscosity increases above 1000 cps within a few days thereafter. On the other hand, compositions containing about 6% methanol, for example, can be stored for as long as 45 days at 25° C., the viscosity of such compositions at that time being less than 1000 cps. Thus, the presence of the alkanol provides compositions which can be stored for considerable periods of time.

The combination of buffering agent and alkanol, if present, inhibits formation of the precipitate otherwise produced when the mixture of urea, formaldehyde, melamine and water of the first component is stored. Furthermore, such additives reduce the rate of viscosity increase in the first component. Consequently, both components can be separately mixed in relatively large volume amounts and stored in separate vessels for future use without significant reaction losses resulting from precipitate formation and viscosity increases. The two components may subsequently be respectively drawn from the vessels and combined in the relative proportions desired immediately prior to the point of use.

The first component is a liquid partially resinous reaction product of urea, formaldehyde and melamine. Its components have been partially reacted during its preparation but the reaction has not been advanced completely to the resinous stage at which a true solution of the components could not be obtained and which product exhibits poor stability. The first component has excellent clarity and no precipitation occurs when equal parts are mixed with water.

It has been found critical to maintain the pH of the first component within the range of about 6.5 to 7.0. If the pH is below about 6.5, the composition gels and is thus unsuitable for use; if the pH is above about 7.0 precipitation occurs which likewise impairs the usefulness of the composition.

The first component is prepared by a process which comprises forming a mixture of about 10 to 15, preferably about 12 to 14, parts by weight urea, about 30 to 40, preferably about 30 to 35, parts by weight formaldehyde, about 5 to 10, preferably about 7 to 9, parts by weight water, about 15 to 25, preferably about 15 to 20, parts by weight melamine and about 0.4 to 1.0, preferably about 0.4 to 0.6, parts by weight of the buffering agent; heating the mixture to a temperature of about 60° to 90° C. with agitation, for a time ranging from about 10 to 60 minutes; cooling the mixture to about 20° to 30° C. within about 10 to 30 minutes and adding to the mixture about 15 to 35, preferably about 16 to 28, parts by weight of water and optionally up to about 6 parts by weight of the alkanol. Preferred temperatures during the heating step are about 65° to 75° C. and the heating is preferably conducted for a period of time ranging from about 20 to 40 minutes. The mixture is preferably cooled to about 25°±2° C. within about 15 to 20 minutes.

The heating step is employed in order to prepare a partially resinous reaction product of urea, formaldehyde and melamine. It has been found that reaction temperatures of above about 90° C. are unsuitable for this invention because the resultant product is incompatible with water, which results in instability (e.g., gelling) of the component. Temperatures below about 60° C. are unsuitable in order to obtain the desired fast dissolution of the melamine in the urea and formaldehyde solution; instability (e.g., gelling) results if dissolution of the melamine is slow. It has also been found that if the heating is conducted for less than about 10 minutes at the above-specified temperatures, the shelf life of the product is adversely affected as precipitates of the resin are formed. Likewise, it has been found that if the heating is conducted for a time greater than about 1 hour, a resinous gel which is already a thermoset product is formed.

It has been found desirable to initially employ a minimal amount of water during the heating step and then add additional water to obtain the necessary viscosity since utilization of a high solids content material in the heating shortens the time necessary to obtain the desired partial reaction.

It has been found necessary to agitate the mixture during the heating step; in the absence of such agitation, the melamine does not become wetted and fails to dissolve within the specified time. Agitation may be provided by suitable mixing devices such as mechanical stirrers, recirculating pumps and the like. Heating and mixing are preferably conducted at atmospheric pressure.

It has been found that the viscosity of the first component is less than about 60 cps when formed and has a stable life of at least about 7 days, the viscosity at such time being less than about 1,000 cps. Preferably, the first component has a stable life of about 30 days or more. By "stable life", it is meant that the first component remains a true solution, exhibits the stated viscosity characteristics and remains clear. The liquid component has excellent clarity and no solids are formed when an equal part of the component and water are admixed.

The second component of this invention comprises a liquid composition comprising about 35 to 55 percent by weight urea, about 45 to 65 percent by weight water and optionally up to about 4 percent by weight of a catalyst which promotes the reaction of urea, melamine and formaldehyde. Preferably, the second component comprises about 40 to 45 percent by weight urea, about 50 to 60 percent by weight water and about 0.5 to 2 percent by weight of the catalyst. Compositions of such a nature are known in the art and are known to exhibit excellent storage stability. Reference is made, for example, to the aforesaid U.S. Pat. No. 3,891,590 to Sundie et al. wherein the second component is described as "component II" therein. As stated in such patent, the catalyst of the second component may be any of those catalysts conventionally used in the board-making industry which promote the desired reaction. Such catalysts include salts of a weak base and a strong acid such as ammonium chloride, ammonium nitrate, ammonium phosphate, aluminum phosphate, ammonium sulfate, and aluminum ammonium sulfate and mixtures thereof. In addition, ammonium may be present together with such catalysts in the form of aqua ammonia (ammonium hydroxide) or the like. Especially preferred as catalysts are mixtures of about 0.5 to 2 percent by weight ammonium nitrate and 0 to 1.5 percent by weight ammonia based on the weight of $NH_3$, and more preferably about 0.5 to 1.5 percent by weight ammonium nitrate and about 0.3 to 0.75 percent by weight ammonia.

The presence of such catalysts is preferred in order to reduce the residence time of fiberboards impregnated with binders prepared from the two-component system. If catalysts are not employed, the dwell times in the heated presses are extended, which may be permissible in certain operations. The pH of the second component may range from about 8 to 10 and preferably is about 8.5 to 9.5.

The composition of the second component may be conveniently prepared at ambient temperature and atmospheric pressure by mixing together the urea, water and catalyst in the indicated amounts. Such composition is a stable aqueous solution which can be stored for an indefinite period of time at ambient temperature. It can be shipped for use with the first component over a period of up to 60 days or more.

Curable amino resins in accordance with this invention can be prepared by mixing together from about 3 to 5 parts by weight, and preferably about 3.5 to 4.5 parts by weight of the first component with 1 part by weight of the second component. This provides a mol ratio of formaldehyde to amine groups (from the urea and melamine) in the range of about 0.8 to 1.0 and preferably about 0.8 to 0.9. Such mixing may be and is preferably achieved at about room temperature, e.g., about 55° to 75° F. and atmospheric pressure. Such mixing can be accomplished by the use of in-line mixing devices well-known in the art, such as an air driven turbine, and is preferably carried out in a fiberboard plant or the like just prior to use. The mixing time will vary depending upon the type of mixing apparatus employed and the batch size.

The curable amino resin compositions of this invention have pot lives suitably in the range of about 12 to 36 hours and are low viscosity resins which possess no "tack" and thus do not present problems with plugging of equipment with the impregnated fibers. They provide excellent penetration and develop strong and intimate bonds with cellulosic and other fibrous materials.

The curable amino resins can be used to bind fiberboard, particleboard, chipboard and other products by conventional board-making procedures. For example, fiberboard may be prepared by impregnating the resin binder into wood particles or fibers, providing an impregnated mat of such fibers of a desired thickness and subjecting the mat to suitable pressure and curing conditions such as radio frequency waves and/or elevated temperatures. The resins of this invention can be used to bond various materials such as wood veneers to form plywood, wood chips to form chipboard, and the like.

In addition, the resins may be used as adhesives to improve the dry and wet strengths of paper. The resin can be bonded to organic and inorganic fibers, and mixtures thereof, such as fibers formed from steamed and mechanically and/or chemically reduced cellulosic or lignocellulosic materials such as wood, newspaper, cotton, straw, bamboo, bagasse and sisal and inorganic materials such as asbestos and mineral wool. Most preferably, the curable amino resins are utilized to form exterior-grade medium density fiberboard. Such boards are produced in accordance with this invention by a process which comprises mixing the resin with particles of mechanically reduced wood fibers, such as by spraying the resin onto the particles, until the particles become impregnated with the resin, forming the impregnated fibers into a mat, and compressing the mat to a desired thickness and at desired curing conditions until the resin is cured and becomes intimately bonded to the fibers. Suitable curing conditions include pressures of about 400 to 600 psi using press platens heated to about 250° to 400° F. The dwell time in the press platens is related to the type of heating presses employed and other factors. Preferably, radio frequency heating is employed and dwell times of about one minute or less may be used whereas if conventional heating is employed, dwell times of about 5 to 6 minutes typically are required.

It has been found that medium density (i.e., about 37 to 50 pounds per cubic foot) fiberboard suitable for exterior use and meeting the applicable ASTM D-1037 requirements can be prepared in accordance with this invention. Thus, a two-component amino resin system is provided in which each component has excellent stability and the two components can be combined at room temperature in a fiberboard plant or other point of use from large storage tanks (e.g., tank cars) of each component and the resulting resin be used shortly after blending. Thus, the necessity of heating components during formation of the resin in such plant has been obviated.

The following non-limiting examples further describe the preferred embodiments of this invention. All parts and percentages are by weight and all properties are determined at 25° C. unless otherwise indicated.

EXAMPLE 1

A. Preparation of the First Component

An 8 liter stainless steel reactor fitted with an air driven stainless steel impeller, a stainless steel heat exchange coil and thermometer, was charged with 2000 parts of U.F. Concentrate 85 (consisting of 25 percent urea, 60 percent formaldehyde and 15 percent water), 622 parts of melamine, 700 parts of water and 20 parts of boric acid and 1 part of borax dissolved in a portion of the water. While agitating, the components were heated to 70° C. (158° F.) by passing steam through the coil and the mixture was maintained at such temperature for 30 minutes. The mixture was cooled to 25° C. in 60 minutes by passing water through the coil after which were added 252 parts of water to which 73 parts of methanol had been added.

The resulting clear liquid had a pH of 6.7 to 6.9, a viscosity of 45 to 55 cps and a shelf life at 25° C. of 12 to 17 days. The composition contained 32.72% formaldehyde, 13.63% urea, 16.96% melamine, 34.13% water, 1.99% melamine, 0.54% boric acid and 0.03% borax.

B. Preparation of the Second Component

In a similar apparatus were charged 391.5 parts of urea, 496.8 parts of water and 9.0 parts of ammonium nitrate. The mixture was heated to about 40° C. with stirring for 5 to 10 minutes until a clear solution was obtained. The solution was quickly cooled to 25° C. and 2.7 parts of 28% ammonium hydroxide mixture was charged and the mixture was agitated for about 5 minutes. The resulting clear liquid, containing 43.5% urea, 55.2% water, 1.0% ammonium nitrate and 0.3% ammonia, had an indefinite shelf life at 25° C., a pH of 9.0, a viscosity of less than 5 cps and a density of 1.13 g/ml.

C. Preparation of the Binder

Nine hundred parts of the second component were mixed with 3668 parts of the first component at 25° C. in a similar apparatus for 5 to 10 minutes. The resulting resin had the following properties:

| | |
|---|---|
| pH | 5.95 |
| viscosity, cps | 25 |
| gel time at 100° C., min. | >10 |
| density, g/ml | 1.23 |
| shelf life, agitated | |
| 25° C. | >24 hours |
| 7.2° C. (45° F.) | >48 hours |
| oven dry solids | 50 6% |

In the above and following tables, shelf life refers to the duration that the liquid maintained a viscosity of less than 100 cps.

EXAMPLE 2

Following the procedure of Example 1, various first and second components were prepared. The resultant binders were used to prepare fiberboards by treating mixed hardwoods fibers having 5 to 6% moisture in a paddle-type blender with 2% of a wax emulsion of Paracol 404-N paraffin wax (available from Hercules Chemical Co.) containing 50% solids. Thereafter, the fibers were sprayed with the binder to obtain a 12% solids application. The treated fiber was passed through an 8 inch Bauer mill to break up the fibers and distribute the binder more evenly. The fiber containing 10 to 11% moisture was formed into mats which were pressed into boards of ½ inch nominal thickness and about 45 to 48 pounds per cubic foot density. The boards were cured in a laboratory 20 by 24 inch press equipped with electrically heated platens and an Industron 20 Kw radio frequency generator. The boards were cured at 500 psi, 280° F. platen temperature and 60 seconds radio frequency cure. The board properties were tested after formation and again after a simulated accelerated aging test which consisted of boiling in water for 4 hours, drying at 145° F. for 20 hours, boiling in water for 4 hours and again drying at 145° F. for 20 hours. The samples were tested 24 hours later. The results are shown in Table 1, below.

TABLE 1

| | SAMPLE | | |
|---|---|---|---|
| | A | B | C |
| BINDER FORMULATION | | | |
| U. F. Conc.-85 | 2000 | 2000 | 2000 |
| Melamine | 622 | 622 | 622 |
| Water (first addition) | 700 | 700 | 700 |
| Boric Acid | 20 | 20 | 20 |
| Borax | 1 | 1 | 1 |
| Water (second addition) | 325 | 325 | 251 |
| Methanol | 0 | 0 | 74 |
| Urea | 391 | 391 | 391 |
| Water | 497 | 497 | 497 |
| Ammonium Nitrate | 9 | 9 | 9 |
| Ammonia (NH₃) | 3 | 3 | 3 |
| Ammonium Sulfate | 0 | 8 | 0 |
| BINDER PROPERTIES | | | |
| pH | 6.1 | 5.7 | 6.0 |
| Viscosity, cps | 33 | 38 | 25 |
| Gel Time, 100° C., min. | >10 | 2.8 | >10 |
| FIBER TREATMENT | | | |
| Resin Solids Applied, % | 12 | 12 | 12 |
| Wax Solids Applied, % | 1 | 1 | 1 |
| Mat Moisture, % | 11.7 | 11.8 | 11.8 |
| FIBER BOARD PROPERTIES | | | |
| Thickness, inch | 0.454 | 0.454 | 0.452 |
| Density, air dried, pounds/cu. ft. | 46.4 | 46.4 | 45.9 |
| Modulus of rupture (MOR), psi | 4600 | 4800 | 4900 |
| Modulus of elasticity, psi | — | — | 450,000 |
| Internal bond, psi | 246 | 246 | 247 |
| BOIL TEST | | | |
| Thickness, inch | | | |
| Before boil | 0.453 | 0.456 | 0.454 |
| After boil | 0.477 | 0.483 | 0.476 |
| MOR, psi | | | |
| Before boil | 4600 | 4800 | 4900 |
| After boil | 4400 | 3700 | 3100 |
| MOR retention, % | 96 | 77 | 63 |

In Table 2, the gel time is the time necessary for 10 grams of the binder to solidify in a test tube immersed in boiling water.

EXAMPLE 3

Example 1 was repeated with the components listed in Table 2, below, except that the first component was cooled to 25° C. in 10 minutes. In each case, the first addition of water was 19.08% of the mixture. The second component contained 43.3% urea, 55.19% water, 1.05% ammonium nitrate and 0.46% free ammonia and had a pH of 9.6, viscosity of 4.5 cps and density of 1.123 g/ml. Binder compositions were prepared by blending 4 parts of the first component with 1 part of the second component at 25° C. Mixed hardwood fiberboard was prepared in the same manner as Example 2. The boards had an air dry density of 45±2 pounds per cubic foot.

Boards were tested under the accelerated aging test of ASTM D-1037-72a with the exceptions noted below. The test consisted of six cycles, each cycle consisting of one hour submersion in water at 120°±3° F., 3 hours submersion in boiling water (deviation from ASTM since no equipment was on hand to spray with steam and water at 200°±5° F.), 20 hours in freezer at 10°±5° F., 3 hours in an air circulating oven at 210°±3° F., 3 hours submersion in boiling water (same deviation) and 18 hours in an air circulating oven at 210°±3° F. The samples were then conditioned for 3 days at ambient temperature and relative humidity prior to testing.

The results are shown in Table 2 under Samples A–D.

TABLE 2

| | A | B | C | D | E |
|---|---|---|---|---|---|
| FIRST COMPONENT | | | | | |
| UFC-85 | 54.53% | 54.53% | 54.53% | 54.53% | |
| Melamine | 16.96 | 16.96 | 16.96 | 16.96 | |
| Boric acid | .54 | .54 | .54 | .54 | |
| Borax | .03 | .03 | .03 | .03 | |
| Methanol | 0 | 2.02 | 4.04 | 6.06 | |
| Water | 27.94 | 25.92 | 23.90 | 21.88 | |
| pH | 6.80 | 6.85 | 6.85 | 6.90 | |
| Viscosity, cps | 42.5 | 45.0 | 45.0 | 45.0 | |
| Density, g/ml | 1.259 | 1.256 | 1.248 | 1.243 | |
| Shelf life, days | 6 | 14 | 25 | 36 | |
| BINDER PROPERTIES | | | | | |
| As prepared | | | | | |
| pH | 6.10 | 6.15 | 6.15 | 6.15 | 6.15 |
| Viscosity, cps | 25.0 | 26.0 | 27.0 | 28.0 | 17.0 |
| Density, g/ml | 1.228 | 1.228 | 1.222 | 1.216 | 1.237 |
| Gel Time at 100° C., min. | 5.7 | 6.7 | 7.5 | 8.3 | 1.9 |
| oven dry solids, % | 52.5 | 53.0 | 52.5 | 52.8 | 52.8 |
| After 24 hrs. at 25° C. | | | | | |

TABLE 2-continued

| | A | B | C | D | E |
|---|---|---|---|---|---|
| pH | 6.30 | 6.40 | 6.35 | 6.40 | |
| Viscosity, cps | 60.0 | 57.0 | 52.0 | 52.0 | |
| Gel time at 100° C., min. | 4.6 | 5.1 | 5.6 | 6.2 | |
| FIBERBOARD PROPERTIES | | | | | |
| Thickness, inch | 0.458 | 0.458 | 0.457 | 0.458 | 0.460 |
| Density, air dried, pounds/cu. ft. | 45.3 | 46.1 | 46.0 | 45.5 | 45.8 |
| MOR, psi | 4500 | 4400 | 4400 | 4300 | 3700 |
| Internal bond, psi | 140 | 148 | 154 | 148 | 143 |
| After Aging | | | | | |
| MOR[1], psi | 4300 | 4900 | 5400 | 3800 | 2800 |
| % retention | 95.5 | 111.4 | 122.7 | 88.4 | 75.7 |
| Internal bond[2], psi | 35 | 45 | 85 | 54 | 49 |
| % retention | 25.0 | 30.4 | 55.2 | 36.5 | 34.3 |

[1]values determined using original dimensions
[2]all breaks on conditioned samples broke at the surfaces rather than in the center of board.

EXAMPLE 4 (Comparative)

As a comparison, a four-component amino resin was prepared by mixing in the same apparatus 44.0 parts U.F. Concentrate 85, 13.68 percent melamine, 8.58 parts uncoated urea prills, and 31.10 parts water, heating the mixture to 70° C. for 10 minutes until the solution was clear, cooling to 25° C. and then adding 2.64 parts of a 25% aqueous ammonium sulfate solution.

Fiberboards were made from this binder in the manner of Example 3. The results are listed in Table 2, under Sample E.

As can be seen from Table 2, the comparative sample had a gel time of only 1.9 minutes, as opposed to 5.7 minutes for Sample A, indicating that Sample A had a much longer shelf life. Fiberboards prepared from Samples A–D resins had superior strength than boards prepared from Sample E. It should also be noted that the comparative sample required a heating step during its preparation prior to its use as a binder and was a four-component system as opposed to the two-component system of this invention.

EXAMPLE 5

Example 3 was repeated with Sample A as the first component, except that the mixture was heated for about 45 minutes. The shelf life (days to reach 1000 cps at room temperature) was about 10 to 12 days.

EXAMPLE 6 (Comparative)

Example 2 was repeated using as the binder the two-component system of U.S. Pat. No. 3,891,590. The first component contained 84% of U.F. Concentrate 85, 5% melamine, 10.7% water and 0.3% ammonium acetate stabilizer. The second component was the same as in Sample A. Boards produced from the binder had a modulus of rupture of 4800 psi and after boiling in water for 4 hours, the modulus of rupture dropped to 500 psi, indicating that such boards were unsuitable for exterior use. In general, boards produced with such binder exhibited a loss in modulus of rupture of greater than 50 percent.

EXAMPLE 7 (Comparative)

This example demonstrates the poor stability of urea-formaldehyde-melamine mixtures of U.S. Pat. No. 3,458,464 to Shriver et al. Preparation of the mixture followed the general procedure of Example 1 of that patent.

850 grams of 30% formaldehyde (8.5 mols of HCHO), 60 grams of urea (1.0 mol) and 63 grams of melamine (0.5 mol) were blended together in a 1,500 ml beaker equipped with a mechanical agitator and heated at a temperature of 65° C. for 20 minutes. The ratio of melamine to urea was about 0.5 mol of melamine for each mol of urea and the mol ratio of formaldehyde to NH$_2$ groups furnished by the melamine and urea present was about 2.5 mols. The pH of the resultant mixture was 5.0.

The mixture was introduced into a 2,000 ml, 3 neck distillation flask. Into one opening of the flask was placed a −20° to 150° C. thermometer. A mechanical stirrer was placed in a second opening, and a third opening was connected to a water cooled condenser. The mixture was heated at a temperature of 70° C. for 25 minutes. Water was then distilled from the mixture at a vacuum of 27 inches and a temperature of 48°–57° C. until 53% distillate was removed from the mixture. The liquid residue contained 69.7% oven dry solids.

Within three days storage at 25° C., the composition became solid, indicating poor stability.

EXAMPLE 8 (Comparative)

This example demonstrates the poor stability of urea-formaldehyde-melamine slurries prepared in accordance with U.S. Pat. No. 3,629,176 to Shriver. Examples 4 and 9 of that patent were generally followed.

A. 100 grams of a non-resinous urea-formaldehyde condensate containing 25 weight percent urea, 60 weight percent formaldehyde and 15 weight percent water were blended with 24 grams urea and 34.9 grams melamine at room temperature in a 500 ml beaker equipped with a mechanical agitator. The urea-formaldehyde-melamine slurry contained 76% solids and had an 0.8:1 formaldehyde to NH$_2$ group mol ratio and a 3:1 urea to melamine mol ratio. There were then incorporated into the slurry 2.5 grams hexamethylene tetramine as buffer and 3.25 grams ammonium chloride as catalyst, and thereafter 26 grams of wheat shell flour were admixed as extender. To the resulting mixture there were then added 50 grams of water to obtain a consistency desired for this adhesive mixture.

B. 2,000 grams of a non-resinous urea-formaldehyde condensate containing 25% by weight urea, 60% by weight formaldehyde and 15% by weight water were blended with 760 grams of uncoated pelleted urea, 360 grams of crystal melamine, 500 grams of water and 50 grams of ammonium sulfate.

After less than three days, both compositions had become solid, indicating that the compositions had poor storage stability.

It is to be understood that varations and modifications of the present invention may be made without departing from the scope of the invention. It is also to be understood that the scope of the invention is not to be interpreted as limited to the specific embodiments disclosed herein, but only in accordance with the appended claims when read in light of the foregoing disclosure.

We claim:

1. A stable aqueous solution of urea, melamine and formaldehyde, which solution has a viscosity when formed of less than about 60 cps and which has a viscosity after about 7 days of less than 1,000 cps, the composition comprising, in percent by weight based upon the total weight of the composition, about 10 to 15 percent urea, about 30 to 40 percent formaldehyde, about 25 to 40 percent water, about 15 to 25 percent melamine, about 0.4 to 1.0 percent of a buffering agent which maintains the pH of the composition at a value ranging from about 6.5 to 7.0, and optionally up to about 6 percent of an alkanol of 1 to 6 carbon atoms.

2. The composition in accordance with claim 1 comprising about 12 to 14 percent urea, about 30 to 35 percent formaldehyde, about 25 to 35 percent water, about 15 to 20 percent melamine and about 0.4 to 0.6 percent of said buffering agent.

3. The composition in accordance with claim 2 comprising from about 2 to about 6 percent of said alkanol.

4. The composition in accordance with claim 3 wherein said alkanol is methanol.

5. The composition in accordance with claim 4 wherein the pH of the composition is in a range of about 6.7 to 6.9.

6. The composition in accordance with claim 5 wherein the viscosity of the composition after thirty days is less than about 1,000 cps.

7. The composition in accordance with claim 1 wherein said buffering agent is a mixture of boric acid and borax.

8. A two-component system useful for preparing an amino resin comprising a first component comprising the composition of claim 1 and a second component, to be blended with the first component in a weight ratio of about 3 to 5 parts of the first component to the second component, the second component comprising about 35 to 55 percent by weight urea, about 45 to 65 percent by weight water and optionally up to about 4 percent by weight of a catalyst which promotes the reaction of urea, melamine and formaldehyde.

9. The two-component system in accordance with claim 8 wherein said second component comprises from about 40 to 45 weight percent urea, from about 50 to 60 weight percent water and about 0.5 to 2 weight percent of said catalyst, and is blended with said first component in a weight ratio of about 3.5 to 4.5 parts of the first to the second.

10. The two-component system in accordance with claim 9 wherein said catalyst is a mixture of ammonium nitrate and ammonia.

11. The two-component system of claim 10 wherein said first component comprises from about 12 to 14 weight percent urea, from about 30 to 35 weight percent formaldehyde, from about 15 to 20 weight percent melamine, from about 25 to 35 weight percent water, from about 0.4 to 0.6 weight percent of said buffering agent, and from about 2 to 6 weight percent of said alkanol.

12. The two-component system in accordance with claim 11 wherein said alkanol is methanol and said buffering agent is a mixture of boric acid and borax.

* * * * *